Patented Oct. 10, 1950

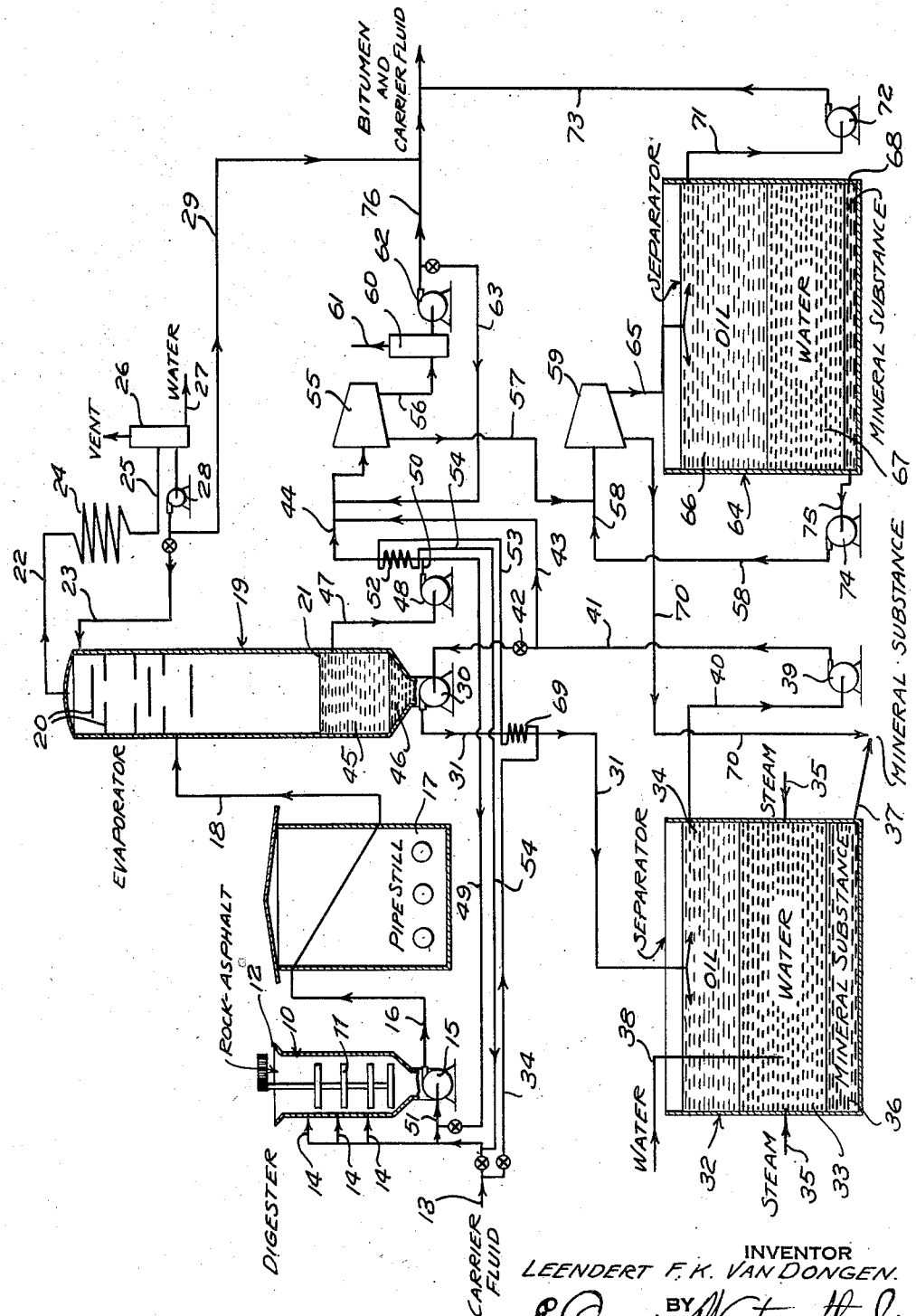

2,524,859

UNITED STATES PATENT OFFICE 2,524,859

TREATMENT OF ROCK ASPHALT, OIL SHALES, AND LIKE MATERIAL

Leendert F. K. van Dongen, Habana, Cuba, assignor to Foster Wheeler Corporation, New York, N. Y., a corporation of New York Application July 30, 1946, Serial No. 687,061

6 Claims. (Cl. 196—14)

1

The present invention relates to processes for treating and refining rock-asphalt, oil shales and like material to obtain petroleum products therefrom and more particularly to a process for removing mineral impurities from rock-asphalt.

This invention provides a process in which rock-asphalt, oil shales or like material is digested in a carrier fluid solvent, such as a medium hydrocarbon oil having a boiling point of approximately 250° C., (482° F.) and is thereafter heated to such temperature that the mixture becomes fluid. The temperature to which the mixture is heated is of sufficient degree so that water therein is vaporized, the viscosity of the mixture will be reduced and settling facilitated, and dissolving of asphalt in the carrier fluid will be completed. The heating temperature would normally be approximately 350° F. After heating, the mixture is passed to an evaporation zone wherein water and a light distillate are evaporated from the mixture. The remainder of the mixture is then conducted into a separation stage in which components thereof of heavier and lighter specific gravity are separated from one another, the heavier component thereafter being passed to another gravity separation stage wherein nonsoluble inorganic substance is removed therefrom. The separated lighter component from the first-mentioned and said other separation stages are further purified by passing them to other separation zones wherein further mineral matter is separated therefrom. Part of the lighter component may be passed from the first-mentioned separation stage into the digester for use as carrier fluid.

The invention will be understood from the following description when considered in connection with the accompanying drawing in which the single figure shows diagrammatically and partly in section suitable apparatus for performing the process of the invention in one embodiment thereof.

Referring to the drawing, the reference numeral 10 designates a digester which, as shown, has an agitator 11 therein. Rock-asphalt, which is finely crushed and which contains oil-soluble hydrocarbon and oil-insoluble inorganic portions, is fed into the digester 10 through inlet 12 at the top thereof and is mixed with a carrier fluid solvent. In order that different operating conditions of temperature and pressure may be applied, the carrier fluid solvent should have such specification that the operating conditions of the process will not influence or change its physical properties. A fluid suitable for this purpose is a medium hydrocarbon oil which has an initial boiling point of approximately 250° C. (482° F.). The amount of carrier fluid introduced into the digester 10 should be such that upon mixing with

2 the rock-asphalt a heavy fluid will result which fluid may be pumped through the apparatus hereinafter described. As shown, carrier fluid is passed through a feed line 13 into the digester 10 through lines 14 connected to the digester at different levels. The carrier fluid and rock-asphalt are thoroughly mixed by the agitator 11 the resulting mixture being a heavy fluid which is pumped from digester 10 by a pump 15, the intake of which pump is in communication with the bottom of the digester 10 while the outlet is in communication with the conduit 16 connected to the inlet of a pipe still 17.

The mixture from the digester 10 is pumped by pump 15 through the pipe still 17 at high velocity. In the pipe still 17, the mixture is heated to such degree that water therein is vaporized, the rock-asphalt is dissolved in the carrier fluid and the viscosity of the mixture is reduced to facilitate easy settling. A suitable temperature, for example, would be substantially 350° F. The discharge pipe 18 of the still 17 is connected to the intake of an evaporator 19 having a plurality of baffle plates 20 in the upper portion thereof and above said intake and a settling portion 21 in the lower part thereof below the intake. The vaporized water, together with any vaporized light fractions in the mixture, passes upwardly in the evaporator 19, the uncondensed portion thereof flowing outwardly of the evaporator at the top thereof through an outlet conduit 22. The light fractions and water flowing from the evaporator through the conduit 22 condenses in a condenser 24 from which the condensate is passed through a line 25 into a gas and liquid separating apparatus 26. In the separating device, water and the light fractions are separated, the water being discharged through outlet pipe 27, while the light fractions are pumped therefrom by pump 28, part of the light fractions being returned to the evaporator 19 through reflux line 23, while another portion is passed through outlet line 29. Baffles 20, together with reflux entering the evaporator through reflux line 23, will prevent foaming in the upper portion of the evaporator. Condensate from the upper part of the evaporator 19, together with the unvaporized portion of the mixture entering the evaporator through line 18, passes downwardly into the settling portion 21. In the settling portion 21, the components of the mixture of heavier specific gravity containing mineral impurities will separate from the mixture passing by force of gravity into the bottom part of the settling portion 21.

The components of heavier specific gravity settled at the bottom of the settling portion 21, as indicated by the reference numeral 46, are pumped from the evaporator 19 through line 31 by a discharge pump 30 into a separator 32, the settled matter being cooled by passing it in indirect heat exchange relationship in a heat exchanger 69 with carrier fluid passed thereinto through line 34 which is connected with the carrier fluid feed line 13. The separator 32 has a water layer 33 therein on top of which the fluid from line 31 is spread. The heavier mineral substance contained in the settled matter introduced into the separator 32 will, through force of gravity, pass downwardly through the water layer 33 while bitumen and carrier fluid, which are of lighter specific gravity than said mineral substance, accumulates in a layer 34 on top of the water layer 33. As the mineral substance passes downwardly through the water layer, adherent films of bitumen are removed therefrom by agitating the water with steam which enters the water layer through steam lines 35. The cleaned mineral substance accumulates at 36 in the bottom of the separator 32 and is removed through discharge line 37 by scrapers or other mechanical means, not shown. The desired amount of water is maintained in the separator 32 by admission of water through the inlet line 38. Normally, the temperature of the water in water layer 33 is maintained slightly below its boiling point so that easier separation may be secured. Either fresh or salt water or a mixture of both is suitable for use in the separator.

The mixture of bitumen and carrier fluid which accumulates in the layer 34 at the top of separator 32 is pumped therefrom by pump 39 through outlet conduit 40 and is discharged from said pump into line 41. Line 41 is valve controlled at 42 and is in communication with the intake of pump 30 at the bottom of the evaporator 19 so that the settled matter 46 from settling portion 21 of the evaporator may be diluted with some of the mixture of carrier fluid and bitumen from the separator 32 before being passed through line 31. The remainder of the mixture of carrier fluid and bitumen from the line 41 flows through line 43 into a conduit 44. Substance of lighter specific gravity than the settled matter 46, which lighter substance comprises a mixture of bitumen and carrier fluid is pumped from layer 45 in the settling portion 21 of the evaporator 19 through a discharge line 47 by pump 48. The discharge of the pump 48 is in communication with conduit 44 and also with conduit 49 through line 50. Conduit 49 is in communication with carrier fluid line 51 which is connected to the intake of pump 15 of digester 10 and to line 13 so that carrier fluid from line 13 and a mixture of carrier fluid and bitumen from layer 45 in the digester may be used to dilute fluid flowing from the digester to the still 17. Fluid flowing through conduit 44 from line 50 is cooled by heat exchanger 52 the intake of which is in communication with the outlet of heat exchanger 69 through line 53, the outlet of heat exchanger 52 communicating with feed line 13 through line 54 so that the carrier fluid used in the heat exchanger will flow to the digester 10.

Fluid flowing through conduit 44 is passed into a centrifugal separator 55 where the fluid is centrifuged, the lighter portion of the fluid passing therefrom through outlet line 56, while the heavier portion flows through outlet line 57 into line 58 thence into a second centrifugal separator 59. The separated portion in the line 56 flows into a gas and liquid separator 60, gas being vented therefrom through line 76 while the liquid is pumped into product line 61 by pump 62. A portion of the liquid in line 61 may be recycled through conduit 63 into conduit 44 to dilute the fluid in said conduit. The lighter separated product from the centrifugal separator 59 is passed into a separator 64, which is somewhat similar to separator 32, through line 65. Separator 64 has a water layer 67 on top of which a layer 66 of bitumen and carrier fluid settles, the heavier mineral matter passing by force of gravity through the water layer 64 settling at 68 in the bottom of separator 64. The heavier separated matter from the centrifugal separator 59, which matter comprises mineral substance is passed from the apparatus through outlet conduit 70. Carrier fluid and bitumen from layer 66 is pumped outwardly of separator 64 through outlet conduit 71 by pump 72 the discharge of which is connected through line 73 with product line 61. Settled substance from the layer 68 of separator 64 is pumped therefrom by pump 74 the intake of which is in communication with said layer through line 75 and the discharge of which is connected to line 58 so that the substance in admixture with heavier matter from centrifugal separator 55 will be centrifuged in separator 59.

The components, carrier fluid and bitumen, of the mixture in product line 61 may be separated one from the other by any well-known process.

It will be apparent that various modifications may be made in the form of the apparatus herein disclosed and in the steps of the method herein described without departing from the spirit of the invention, which is not to be limited excepting by the scope of the appended claims.

What is claimed is:

1. The process of purifying rock-asphalt, oil shales and like material containing both oil-soluble hydrocarbon and oil-insoluble inorganic substances which process comprises producing a fluid mixture in a mixing zone by digesting said material in an oil dissolving hydrocarbon solvent, flowing said mixture from the mixing zone to a heating zone, heating said mixture in the heating zone to a temperature above the boiling point of water and of sufficient degree to dissolve the oil-soluble substance in the solvent and reduce the viscosity of the mixture sufficiently to facilitate separation of the oil-insoluble inorganic substance from the mixture but to heat the mixture to a temperature below the boiling point of said mixture, passing the heated mixture from the heating zone to an evaporation and separation zone having an upper vapor and liquid contact portion and a lower separating portion wherein components of heavier specific gravity and components of lighter specific gravity are separated by specific gravity difference, introducing the heated mixture into the evaporating zone at a point intermediate the vapor and liquid contact portion and the separating portion, flowing vapor resulting from heating of said mixture in contact with reflux in the upper portion of the evaporating zone, passing uncondensed vapor from said upper portion, condensing uncondensed vapor from said upper portion, returning at least a portion of the condensate from the uncondensed vapor to the upper portion of the evaporating zone for use as reflux, flowing heated liquid mixture from the heating zone and liquid from said vapor and liquid contact portion into the lower separating portion, separating components of heavier specific gravity and components of lighter specific gravity in the separating portion by specific gravity difference, withdrawing the components of lighter specific gravity from the separating portion, withdrawing said heavier component from the separating portion and introducing it into a further separating zone containing water wherein hydrocarbon material and inorganic material in said heavier component are separated from one another, said inorganic material settling through said water while the hydrocarbon material remains on top thereof, withdrawing the separated hydrocarbon material from the further separating zone, and recycling at least part of said separated hydrocarbon material into said withdrawn heavier component prior to introduction of said heavier component into the further separating zone.

2. The process of purifying rock-asphalt, oil shales and like material containing both oil-soluble hydrocarbon and oil-insoluble inorganic substances which process comprises producing a fluid mixture in a mixing zone by digesting said material in an oil dissolving hydrocarbon solvent, flowing said mixture from the mixing zone to a heating zone, heating said mixture in the heating zone to a temperature above the boiling point of water and of sufficient degree to dissolve the oil-soluble substance in the solvent and reduce the viscosity of the mixture sufficiently to facilitate separation of the oil-insoluble inorganic substance from the mixture but to heat the mixture to a temperature below the boiling point of said mixture, passing the heated mixture from the heating zone to an evaporation and separation zone having an upper vapor and liquid contact portion and a lower separating portion wherein components of heavier specific gravity and components of lighter specific gravity are separated by specific gravity difference, introducing the heated mixture into the evaporating zone at a point intermediate the vapor and liquid contact portion and the separating portion, flowing vapor resulting from heating of said mixture in contact with reflux in the upper portion of the evaporating zone, passing uncondensed vapor from said upper portion, condensing uncondensed vapor from said upper portion, returning at least a portion of the condensate from the uncondensed vapor to the upper portion of the evaporating zone for use as reflux, flowing heated liquid mixture from the heating zone and liquid from said vapor and liquid contact portion into the lower separating portion, separating components of heavier specific gravity and components of lighter specific gravity in the separating portion by specific gravity difference, flowing said lighter component from the separating portion, withdrawing said heavier component from the separating portion and introducing it into a further separating zone containing water wherein hydrocarbon material and inorganic material in said heavier component are separated from one another, said inorganic material settling through said water, and separating oil-insoluble inorganic material from the lighter component passed from said separating portion and the hydrocarbon material from the further separating zone by centrifuging said hydrocarbon material and lighter component therefrom.

3. The process of purifying rock-asphalt, oil shales and like material containing both oil-soluble hydrocarbon and oil-insoluble inorganic substances which comprises producing a fluid mixture in a mixing zone by digesting said material in an oil dissolving hydrocarbon solvent, flowing said mixture from the mixing zone to a heating zone, heating said mixture in the heating zone to a temperature above the boiling point of water and of sufficient degree to dissolve the oil-soluble substance in the solvent and reduce the viscosity of the mixture sufficiently to facilitate separation of the oil-insoluble inorganic substance from the mixture but to heat the mixture to a temperature below the boiling point of said mixture, passing the heated mixture from the heating zone to an evaporation and separation zone having an upper vapor and liquid contact portion and a lower separating portion wherein components of heavier specific gravity and components of lighter specific gravity are separated by specific gravity difference, introducing the heated mixture into the evaporating zone at a point intermediate the vapor and liquid contact portion and the separating portion, flowing vapor resulting from heating of said mixture in contact with reflux in the upper portion of the evaporating zone, passing uncondensed vapor from said upper portion, condensing uncondensed vapor from said upper portion, returning at least a portion of the condensate from the uncondensed vapor to the upper portion of the evporating zone for use as reflux, flowing heated liquid mixture from the heating zone and liquid from said vapor and liquid contact portion into the lower separating portion, separating components of heavier specific gravity and the components of lighter specific gravity of the mixture in the separating portion from one another by specific gravity difference, flowing said lighter component from the separating portion, withdrawing said heavier component from the separating portion and introducing it into a further separating zone containing water wherein hydrocarbon material and inorganic material in said heavier component are separated from one another, said inorganic material settling through said water, separating oil-insoluble inorganic material from said lighter component from said separating portion and the hydrocarbon material from the further separating zone by centrifuging said hydrocarbon material and lighter component therefrom, passing the separated oil-insoluble inorganic material into a second centrifugal separating stage, flowing the separated lighter component from the second centrifugal separating stage to a still further separation step based upon specific gravity difference, and flowing the lighter component from the first-mentioned centrifugal separation step and the last-mentioned gravity separation step into a product line.

4. The process of purifying rock-asphalt, oil shales and like material containing both oil-soluble hydrocarbon and oil-insoluble inorganic substances which process comprises producing a fluid mixture in a mixing zone by digesting said material in an oil dissolving hydrocarbon solvent having a boiling point of approximately 482° F., flowing said mixture from the mixing zone to a heating zone, heating said mixture in the heating zone to substantially 350° F., passing the heated mixture from the heating zone to an evaporation and separation zone having an upper vapor and liquid contact portion and a lower separating portion wherein components of heavier specific gravity and components of lighter specific gravity are separated by specific gravity difference, introducing the heated mixture into the evaporating zone at a point intermediate the vapor and liquid contact portion and the separating portion, flowing vapor resulting from heating of said mixture in contact with reflux in the upper portion of the evaporating zone, passing uncondensed vapor from said upper portion, condensing uncondensed vapor from said upper portion, returning at least a portion of the condensate from the uncondensed vapor to the upper portion of the evaporating zone for use as reflux, flowing heated liquid mixture from the heating zone and liquid from said vapor and liquid contact portion into the lower separating portion, separating components of heavier specific gravity and components of lighter specific gravity in the separating portion by specific gravity difference, flowing said lighter component from the separating portion, withdrawing said heavier component from the separating portion and introducing it into a further separating zone containing water wherein hydrocarbon material and inorganic material in said heavier component are separated from one another, said inorganic material settling through said water, and separating oil-insoluble inorganic material from the lighter component passed from said separating portion and the hydrocarbon material from the further separating zone by centrifuging said hydrocarbon material and lighter component therefrom.

5. The process of purifying rock-asphalt, oil shales and like material containing both oil-soluble hydrocarbon and oil-insoluble inorganic substances which process comprises producing a fluid mixture in a mixing zone by digesting said material in an oil dissolving hydrocarbon solvent, flowing said mixture from the mixing zone to a heating zone, heating said mixture in the heating zone to a temperature above the boiling point of water and of sufficient degree to dissolve the oil-soluble substance in the solvent and reduce the viscosity of the mixture sufficiently to facilitate separation of the oil-insoluble inorganic substance from the mixture but to heat the mixture to a temperature below the boiling point of said mixture, passing the heated mixture from the heating zone to an evaporation and separation zone having an upper vapor and liquid contact portion and a lower separating portion wherein components of heavier specific gravity and components of lighter specific gravity are separated by specific gravity difference, introducing the heated mixture into the evaporating zone at a point intermediate the vapor and liquid contact portion and the separating portion, flowing vapor resulting from heating of said mixture in contact with reflux in the upper portion of the evaporating zone, passing uncondensed vapor from said upper portion, condensing uncondensed vapor from said upper portion, returning at least a portion of the condensate from the uncondensed vapor to the upper portion of the evaporating zone for use as reflux, flowing heated liquid mixture from the heating zone and liquid from said vapor and liquid contact portion into the lower separating portion, separating components of heavier specific gravity and components of lighter specific gravity in the separating portion by specific gravity difference, flowing said lighter component from the separating portion, withdrawing said heavier component from the separating portion and introducing it into a further separating zone containing water wherein hydrocarbon material and inorganic material in said heavier component are separated from one another, said inorganic material settling through said water, agitating said water with steam to remove hydrocarbon material from said inorganic material settling through the water, and separating oil-insoluble inorganic material from the lighter component passed from said separating portion and the hydrocarbon material from the further separating zone by centrifuging said hydrocarbon material and lighter component therefrom.

6. The process of purifying rock-asphalt, oil shales and like material containing both oil-soluble hydrocarbon and oil-insoluble inorganic substances which process comprises producing a fluid mixture in a mixing zone by digesting said material in an oil dissolving hydrocarbon solvent, flowing said mixture from the mixing zone to a heating zone, heating said mixture in the heating zone to a temperature above the boiling point of water and of sufficient degree to dissolve the oil-soluble substance in the solvent and reduce the viscosity of the mixture sufficiently to facilitate separation of the oil-insoluble inorganic substance from the mixture but to heat the mixture to a temperature below the boiling point of said mixture, passing the heated mixture from the heating zone to an evaporation and separation zone having an upper vapor and liquid contact portion and a lower separating portion wherein components of heavier specific gravity and components of lighter specific gravity are separated by specific gravity difference, introducing the heated mixture into the evaporating zone at a point intermediate the vapor and liquid contact portion and the separating portion, flowing vapor resulting from heating of said mixture in contact with reflux in the upper portion of the evaporating zone, passing uncondensed vapor from said upper portion, condensing uncondensed vapor from said upper portion, returning at least a portion of the condensate from the uncondensed vapor to the upper portion of the evaporating zone for use as reflux, flowing heated liquid mixture from the heating zone and liquid from said vapor and liquid contact portion into the lower separating portion, separating components of heavier specific gravity and components of lighter specific gravity in the separating portion by specific gravity difference, flowing said lighter component from the separating portion, withdrawing said heavier component from the separating portion and introducing it into a further separating zone containing water wherein hydrocarbon material and inorganic material in said heavier component are separated from one another, said inorganic material settling through said water, recycling at least part of said separated hydrocarbon material into said withdrawn heavier component prior to introduction of said heavier component into the further separating zone, and separating oil-insoluble inorganic material from the lighter component passed from said separating portion and another part of said hydrocarbon material from the further separating zone by centrifuging said hydrocarbon material and lighter component therefrom.

LEENDERT F. K. van DONGEN.

REFERENCES CITED

The following references are of record in the file of this patent:

UNITED STATES PATENTS

| Number | Name | Date |
|---|---|---|
| 1,327,572 | Ryan | Jan. 6, 1920 |
| 1,357,278 | Day | Nov. 2, 1920 |
| 1,458,983 | Kirby | June 19, 1923 |
| 1,497,607 | Streppel | June 10, 1924 |
| 1,607,977 | Armstrong | Nov. 23, 1926 |
| 1,778,515 | Hampton | Oct. 14, 1930 |
| 2,431,677 | Brown | Dec. 2, 1947 |